US010162722B2

(12) United States Patent
Lin et al.

(10) Patent No.: US 10,162,722 B2
(45) Date of Patent: Dec. 25, 2018

(54) VIRTUAL MACHINE AWARE REPLICATION METHOD AND SYSTEM

(75) Inventors: Chris Chih-Chen Lin, San Jose, CA (US); Viswesvaran Janakiraman, San Jose, CA (US)

(73) Assignee: VERITAS TECHNOLOGIES LLC, Mountain View, CA (US)

(*) Notice: Subject to any disclaimer, the term of this patent is extended or adjusted under 35 U.S.C. 154(b) by 704 days.

(21) Appl. No.: 12/837,445

(22) Filed: Jul. 15, 2010

(65) Prior Publication Data

US 2012/0016840 A1    Jan. 19, 2012

(51) Int. Cl.
*G06F 17/30* (2006.01)
*G06F 11/20* (2006.01)
*G06F 11/14* (2006.01)

(52) U.S. Cl.
CPC .... *G06F 11/2097* (2013.01); *G06F 17/30212* (2013.01); *G06F 17/30233* (2013.01); *G06F 11/1484* (2013.01); *G06F 2201/815* (2013.01); *G06F 2201/84* (2013.01)

(58) Field of Classification Search
CPC ......... G06F 17/30233; G06F 17/30575; G06F 17/30578; G06F 17/30038
See application file for complete search history.

(56) References Cited

U.S. PATENT DOCUMENTS

| | | | |
|---|---|---|---|
| 6,055,227 A * | 4/2000 | Lennert et al. | 370/254 |
| 6,618,736 B1 * | 9/2003 | Menage | |
| 6,973,549 B1 * | 12/2005 | Testardi | 711/150 |
| 7,243,207 B1 * | 7/2007 | Prakash | G06F 17/30067 707/E17.01 |
| 7,334,095 B1 * | 2/2008 | Fair et al. | 711/161 |
| 7,363,290 B1 * | 4/2008 | Daniel et al. | 707/673 |
| 7,409,494 B2 * | 8/2008 | Edwards et al. | 711/114 |
| 7,472,254 B2 * | 12/2008 | Collins | G06F 17/30176 707/E17.01 |
| 2002/0091702 A1 * | 7/2002 | Mullins | 707/100 |
| 2002/0147862 A1 * | 10/2002 | Traut | G06F 3/0623 710/1 |
| 2003/0093444 A1 * | 5/2003 | Huxoll | 707/204 |
| 2004/0158589 A1 * | 8/2004 | Liang et al. | 707/206 |
| 2006/0225065 A1 | 10/2006 | Chandhok et al. | |

(Continued)

OTHER PUBLICATIONS

International Search Report and Written Opinion for International Application No. PCT/US2011/038950 dated Feb. 1, 2012. 11 pages.

*Primary Examiner* — Robert W Beausoliel, Jr.
*Assistant Examiner* — Nirav K Khakhar
(74) *Attorney, Agent, or Firm* — Patent Law Works LLP

(57) ABSTRACT

A method for replicating a virtual file system of a virtual machine. The method includes accessing a host file system usage map of a host machine that indicates active blocks out of a plurality of blocks of the host file system, and accessing a virtual file system usage map of a virtual machine that indicates active blocks out of a plurality of blocks of the virtual file system. A merged usage map is generated from information of the host file system usage map and the virtual file system usage map that identifies active blocks of the host file system associated with the virtual file system. The virtual file system is then replicated at a replication destination in accordance with the merged usage map.

16 Claims, 11 Drawing Sheets

(56) References Cited

U.S. PATENT DOCUMENTS

2007/0094345 A1\* 4/2007 Rabbers ............ G06F 17/30147
  709/217
2008/0288506 A1 11/2008 Brown
2010/0131466 A1\* 5/2010 Chen ............................ 707/615

\* cited by examiner

VIRTUAL MACHINE AWARE REPLICATION METHOD AND SYSTEM

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Continuous replication technology often includes RAID based replication schemes (e.g., disk mirroring, parity, or the like). Continuous replication maintains copies of the data as the data is being written to by applications. Periodic replication is another technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. For both continuous replication and periodic replication, in addition to disaster recovery, the replicated data enables a number of other uses, such as, for example, data mining, reporting, testing, and the like. In this manner, the replicated data copy ensures data integrity and availability. Additionally, replication technology is frequently coupled with other high-availability techniques, such as clustering, to provide an extremely robust data storage solution.

Data storage required for applications such as file systems and databases are typically allocated from one or more storage devices that are maintained as a "volume." The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

In very large distributed computer systems the data is distributed in number of data servers. The clients directly write data to the data servers with minimal points of interaction with any metadata server. The data servers typically have multiple LUNs (logical unit numbers) which have their own reserved storage space. Each LUN can have a large number of partitions, with the objects contained in these partitions. The files of distributed computer system file system are composed of the objects from any of the data server LUN partitions. The objects from various data servers are combined to form RAID groups.

In a virtual environment such as Hyper-V, performance of the virtual disk is best when fixed VHD is used as compared to dynamic VHD. Fixed VHD allocates all blocks in the file system when the VHD is created. Therefore, for example, a 24 GB fixed VHD will create a file that is about 24 GB. This is different from dynamic VHD which, for example, only allocates enough storage to store data that is actually written to the VHD. A 24 GB dynamic VHD may only occupy a few MB when it's created. Fixed VHD is good for performance, but it presents a challenge for an optimized replication process, where file system information is used to reduce the amount of data to be copied when a new mirror is added to a volume.

Since fixed VHD allocates all blocks in advance, a conventional implementation of an optimized replication process cannot skip any block used by the VHD even though not all blocks are used by the VHD file. Conventional implementation of "optimized mirror/clone creation" can only skip white spaces not in use outside of the VHD files themselves and not within the file systems they host. Thus a typical volume hosting many such large VHD files cannot reap any performance benefits by simply using file system information on the volume. This factor causes replication processes performed in the conventional optimized manner to be excessively time consuming and overly resource intensive.

SUMMARY OF THE INVENTION

Embodiments of the present invention provide a solution that enables an efficient, highly available, and highly scalable process for the replication of data for a distributed computer system including one or more virtual machines. Embodiments of the present invention implement an optimized scheme that can look into individual VHD files thru the file systems they host to truly eliminate copying white spaces.

In one embodiment, the present invention is implemented as a method for replicating a virtual file system of a virtual machine. The method includes accessing a host file system usage map of a host machine that indicates active blocks out of a plurality of blocks of the host file system, and accessing a virtual file system usage map of a virtual machine that indicates active blocks out of a plurality of blocks of the virtual file system. A merged usage map is generated from information of the host file system usage map and the virtual file system usage map that identifies active blocks of the host file system associated with the virtual file system. The virtual file system is then replicated at a replication destination in accordance with the merged usage map.

In one embodiment, the virtual machine is mounted by the host machine to access the host file system.

In one embodiment, the virtual file system is instantiated as a fixed virtual storage device.

In one embodiment, the virtual file system is instantiated as a dynamically allocated virtual storage device.

In one embodiment, a snapshot of the virtual file system is generated to support the replication of the virtual file system.

In one embodiment, the snapshot enables the virtual file system to remain online during the replication of the virtual file system.

In one embodiment, the replication destination is a physical storage device that implements RAID functionality.

In one embodiment, the host file system usage map comprises a file system usage bitmap.

In one embodiment, the present invention is implemented as a computer readable storage medium having stored thereon, computer executable instructions that, if executed by a computer system cause the computer system to perform a replication method. The method includes accessing a host file system usage map of a host machine that indicates active blocks out of a plurality of blocks of the host file system, and accessing a virtual file system usage map of a virtual machine that indicates active blocks out of a plurality of blocks of the virtual file system. A merged usage map is generated from information of the host file system usage map and the virtual file system usage map that identifies active blocks of the host file system associated with the virtual file system. The virtual file system is then replicated at a replication destination in accordance with the merged usage map.

In one embodiment, the present invention is implemented as a volume replication system. The system includes a computer system having a processor coupled to a computer readable storage media and executing computer readable code which causes the computer system to implement a replication manager module. The replication manager module accesses a host file system usage map of a host machine that indicates active blocks out of a plurality of blocks of the host file system, and accesses a virtual file system usage map of a virtual machine that indicates active blocks out of a plurality of blocks of the virtual file system. The replication manager module generates a merged usage map from information of the host file system usage map and the virtual file system usage map that identifies active blocks of the host file system associated with the virtual file system. The replication manager module then replicates the virtual file system at a replication destination in accordance with the merged usage map.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
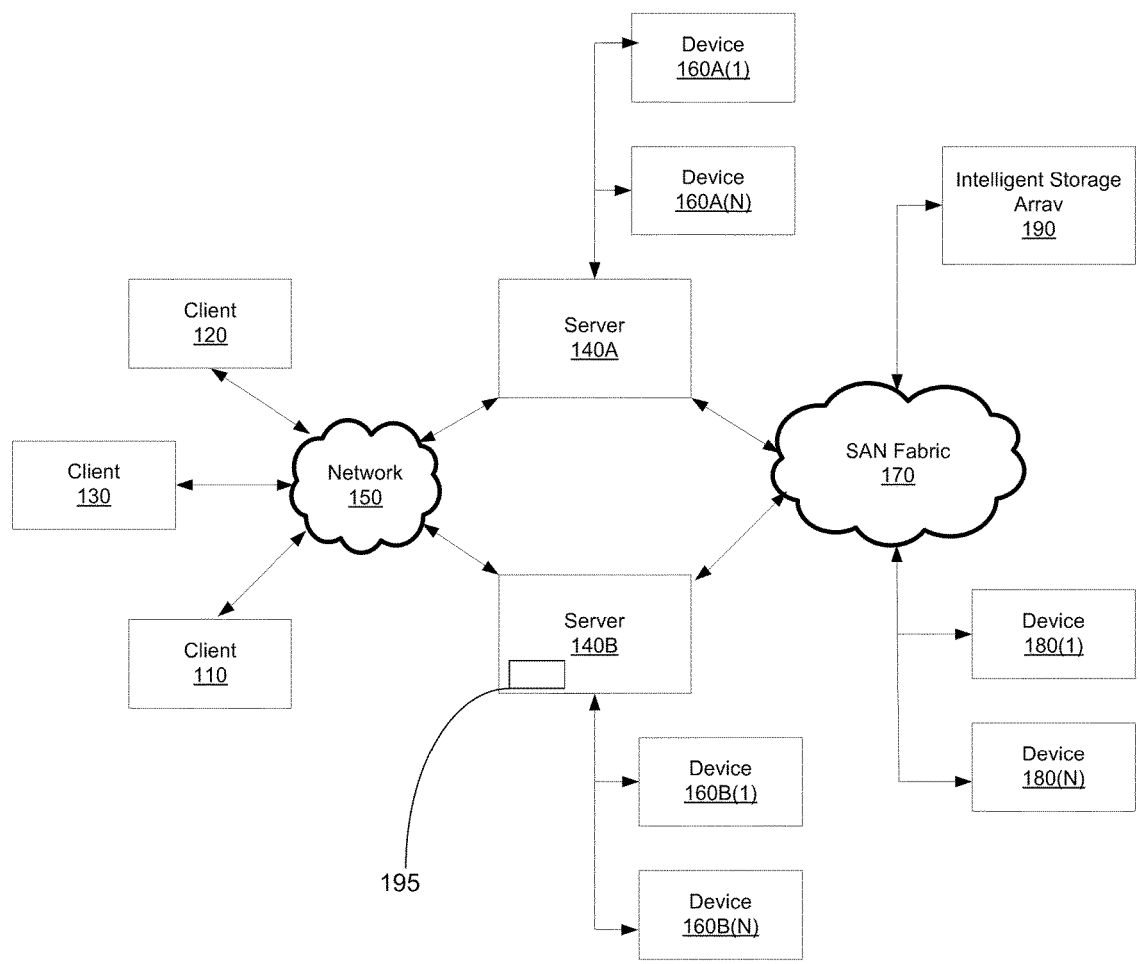
FIG. 1 illustrates a periodic replication operation within a replication system environment according to one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention are directed towards solving the following problem. How-to efficiently create a new copy, mirror or clone of a data volume used in a virtualized environment (e.g., Hyper-V, VMWare, etc.) to host one or more virtual file systems (e.g., on fixed type VHD, VMDK etc) belonging to one or more virtual machines, by copying only the actual data blocks in use at the host files system and inside the individual virtual file systems.

Embodiments of the present invention provide a solution that enables an efficient and highly scalable process for the replication of data for a distributed computer system including one or more virtual machines. Embodiments of the present invention can replicate a data volume optimally. The volume may have one or more virtual file systems belonging to one or more virtual machines. Embodiments of the present invention are optimized to function with highly scalable distributed computer systems having hundreds of virtual nodes and physical nodes, or more (e.g., cloud computing system, etc.). In a typical usage scenario, application data resides across a large number of data server nodes. These data server nodes can be physical nodes, virtual nodes, or a combination of the two. Clients interact with the distributed computer system by directly writing data to one or more of the virtual/physical data server nodes. The physical nodes (e.g., data servers) typically have multiple LUNs (logical unit numbers) which each have their own reserved storage space. A typical implementation would have the LUNs configured with multiple partitions.

The files of the distributed computer system are composed of objects (e.g., data objects, etc.) which can be from any of the data server nodes, any of the LUNs and/or any of the partitions. Embodiments of the present invention efficiently handle replication for the virtual nodes of the distributed computer system in a manner that is scalable and provides high availability. Additionally, embodiments of the present invention implement their application processes without taking the virtual nodes off-line.

Embodiments of the present invention implement a method for replicating a virtual file system of a virtual machine (e.g., the data objects, etc. that comprise the virtual file system). In order to maintain the online status of the virtual file system, embodiments of the present invention generate a snapshot (e.g., a space optimized snapshot of the host data volume) which enables access to an off-line copy of the host file system (e.g., the host data volume) including the virtual file system. The method then accesses a host file system usage map of a host machine that indicates active blocks out of a plurality of blocks of the host file system, and accessing a virtual file system usage map of a virtual machine that indicates active blocks out of a plurality of blocks of the virtual file system. A merged usage map is generated from information of the host file system usage map and the virtual file system usage map. The merged usage map identifies active blocks of the host file system associated with the virtual file system. The data objects, etc. that comprise the virtual file system are then replicated at a replication destination in accordance with the merged usage map. The application destination can be used to implement any of a number of different RAID processes (e.g., RAID 1, RAID 5, etc.). A typical computer system environment is now described in the discussions of FIG. 1 below.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A (1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a replication manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.). A typical replication process is now described in the discussions of FIG. 2 below.

Figure 2:
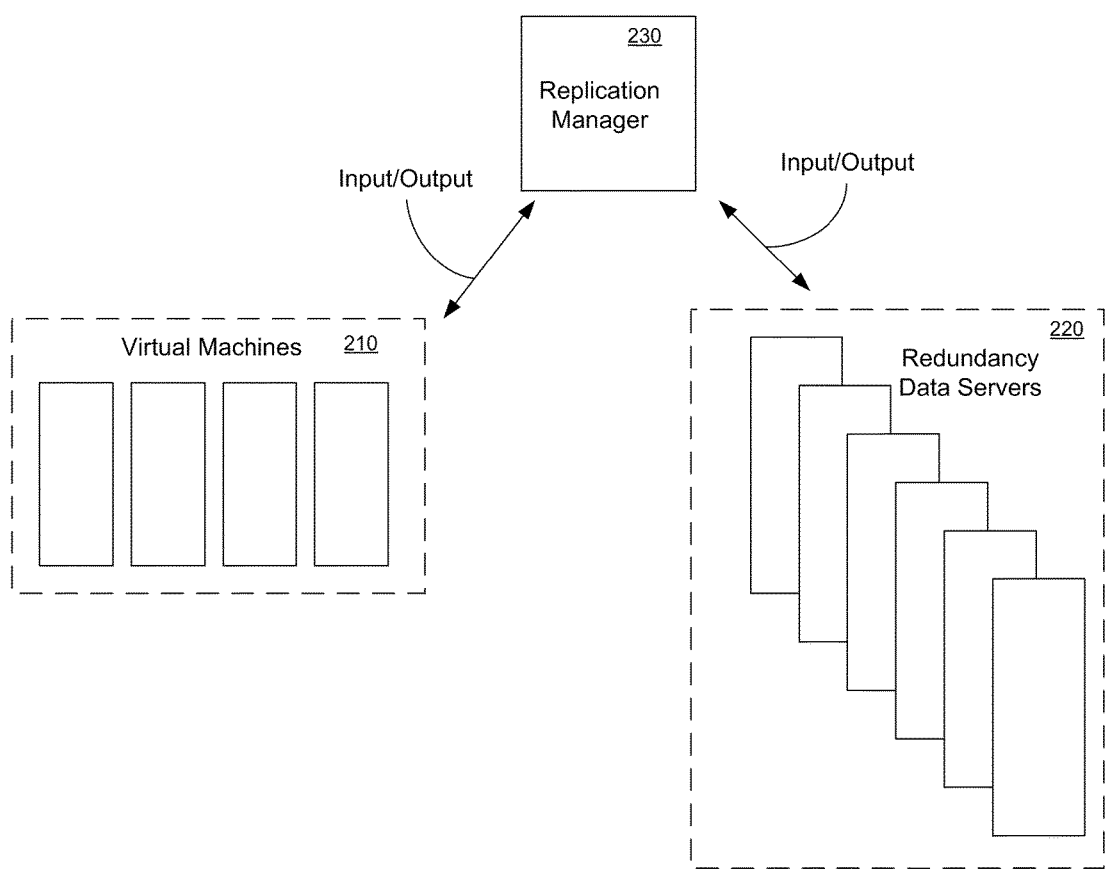
FIG. 2 shows a periodic replication operation as implemented between virtual machines nodes and redundancy data server nodes in accordance with one embodiment of the present invention.

FIG. 2 shows a data flow diagram 200 depicting the operation of an exemplary replication process in accordance with one embodiment of the present invention. As depicted in FIG. 2, a group of virtual machine data servers 210 host data that is accessed by a large number of client computer systems (e.g., clients 110-130). As I/O data comes in from the client computer systems (e.g., I/O writes), the I/O data is forwarded to a replication manager 230, which processes the I/O data and transfers it to a plurality of redundant data servers 220.

The FIG. 2 embodiment illustrates a scalable distributed computer system environment. In one embodiment, the distributed computer system environment implements any of a number of different RAID redundancy schemes by forwarding data from the replication manager 230 to the plurality of redundancy data servers 220.

Through the normal course of operation, the client's I/O data, specifically their write data (e.g., the similar holds true for the metadata written by one or more metadata servers) is generated, or received and stored on the virtual machines 210. The virtual machines 210 then forward these data objects to the replication manager 230. The replication manager 230 then forwards these data objects to the destination redundancy data servers according to the replication policy, such as, for example, the RAID policy. For example if the RAID policy for the file is RAID-1 then it just has to copy the data, whereas if the RAID policy is RAID-5 then it has to distribute the data, compute the parity, or even at times read the old data and merge the data before computing parity.

Figure 3:
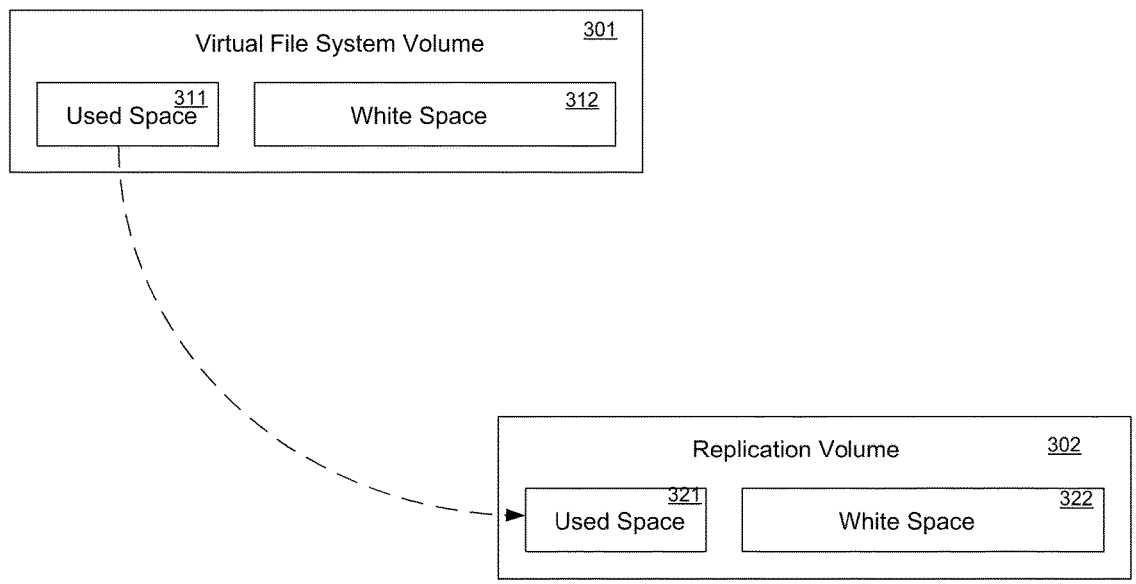
FIG. 3 shows an exemplary virtual file system volume and replication volume 302 in accordance with one embodiment of the present invention.

FIG. 3 shows an exemplary virtual file system volume and replication volume 302 in accordance with one embodiment of the present invention. As depicted in FIG. 3, the file system volume comprises both a certain amount of used space 311 and a remaining amount of unused space, which is depicted as whitespace 312. Thus, for example, in a virtual environment such as Hyper-V, where fixed VHD is used, with for example, a 24 GB fixed capacity, as compared to dynamic VHD, a file system volume may only use a sub portion (e.g., used space 311) of the total number of blocks comprising the 24 GB fixed VHD.

Embodiments of the present invention advantageously enable the use of fixed VHD for high I/O performance, while implementing an optimized replication process, where file system information is used to reduce the amount of data to be copied when a new mirror is added to a volume. Embodiments of the present invention implement the optimized replication process without taking the virtual file system volume off-line. This aspect greatly improves the availability of the application/data supported by the virtual file system volume. Embodiments of the present invention minimize the I/O traffic during a replication process by transferring only the used space 311 to create the replication volume 302. When the replication is complete, the replication volume 302 will include used space 321 and whitespace 322 and will be mirror of the virtual file system volume 301.

Figure 4:
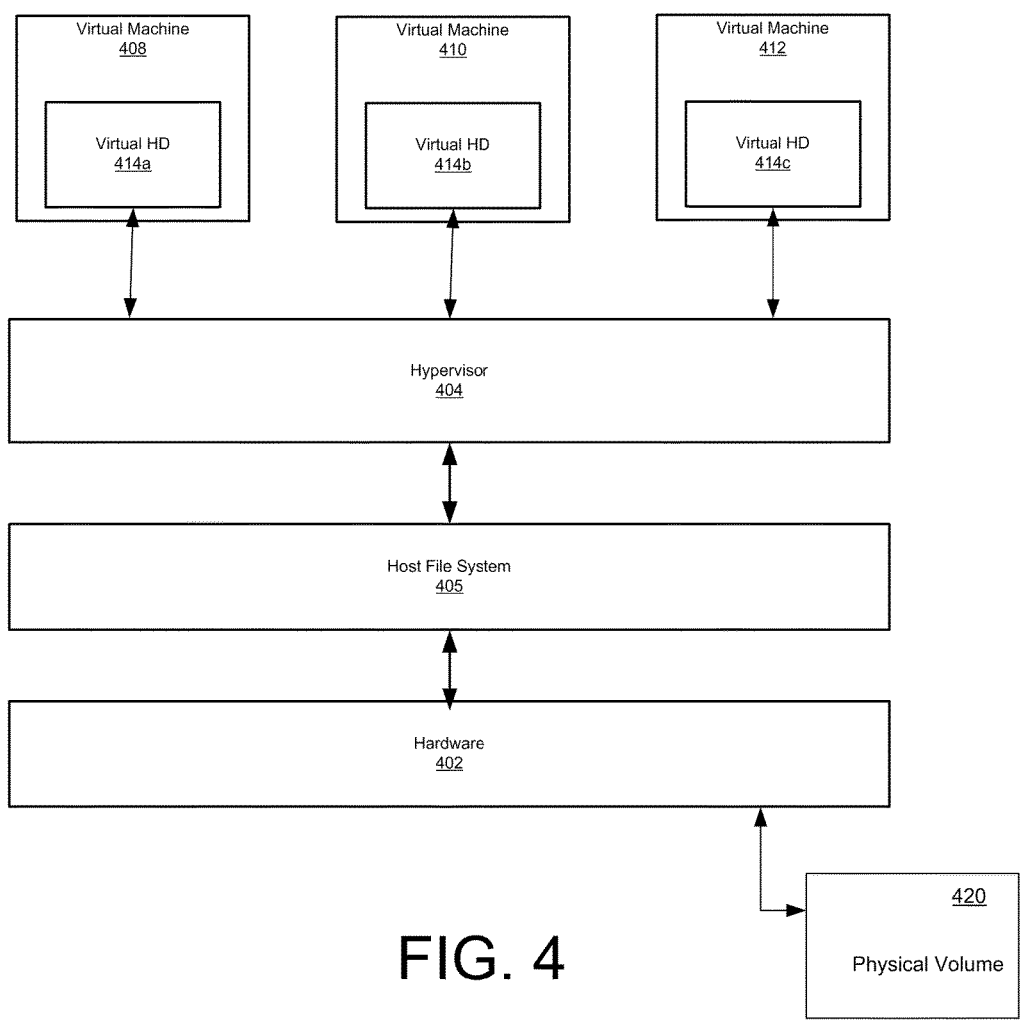
FIG. 4 shows a block diagram of an exemplary virtual environment, in accordance with one embodiment of the present invention.

FIG. 4 shows a block diagram of an exemplary virtual environment, in accordance with one embodiment of the present invention. Exemplary virtual environment 400 includes a host file system 405, hypervisor 404, and virtual machines 408-412. Components of exemplary virtual environment 400 typically execute on or otherwise be part of a distributed computing system (e.g., servers 140a and 140b of FIG. 1).

Hypervisor 404 interfaces with hardware 402 (e.g., of servers 140a-b) and provides resources and services to virtual machines 408-412. In one embodiment, hypervisor 404 is part of a trusted computing base (TCB). Hypervisor 404 provides abstractions including emulated devices of resources in hardware 402 to virtual machines 408-412. In this manner, the virtual hard drives 414a-c are emulated via the hypervisor 404 and the host file system 405 by using a physical volume 420. The physical volume 420 can be, for example, one or more LUNs on server 140A or 140B, or one of storage devices 160A(1)-(N), 160B(1)-(N), 180(1)-(N) or storage array 190.

Figure 5:
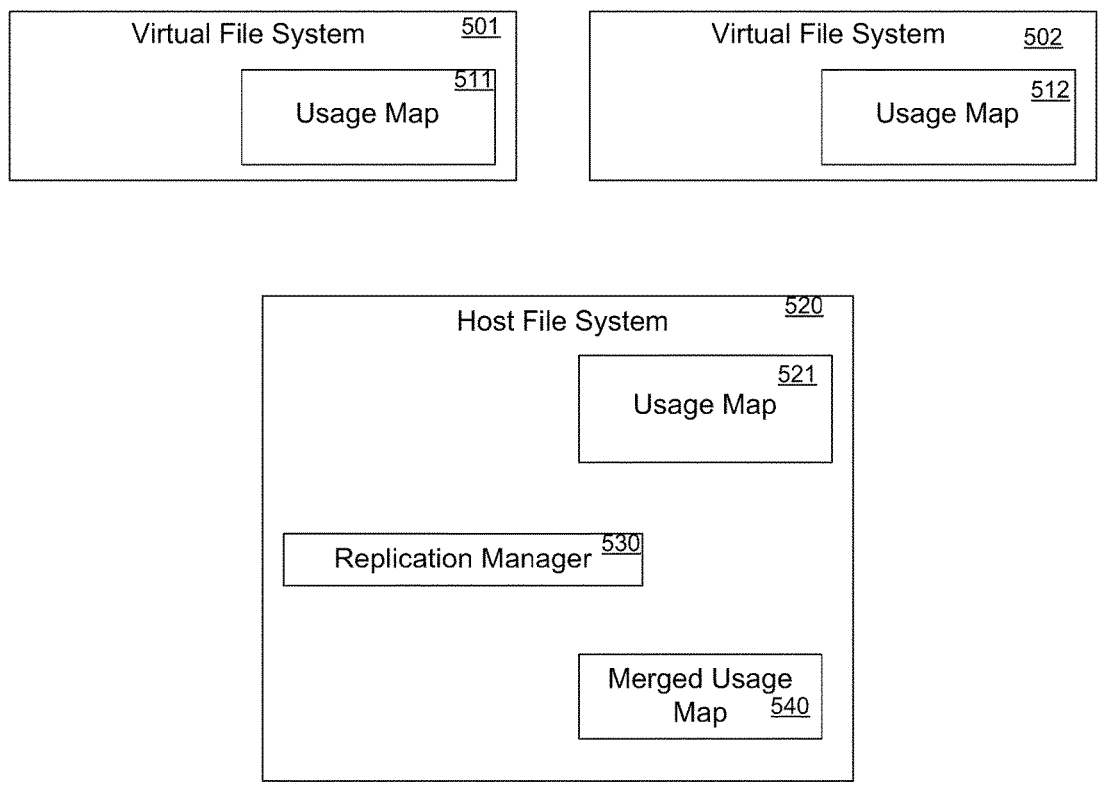
FIG. 5 shows an exemplary virtual file system including respective usage maps in accordance with one embodiment of the present invention.

FIG. 5 shows an exemplary virtual file system 501 and a virtual file system 502, including respective usage maps 511 and 512, in accordance with one embodiment of the present invention. FIG. 5 also shows a host file system 520 with its respective usage map 521.

The FIG. 5 embodiment shows the respective usage maps 511-512 of the virtual file systems 501-502 of two different virtual machines. It should be noted that although two virtual file systems 501-502 are shown, the host file system may be supporting many more (e.g., 10 to 20, or even more). Embodiments of the present invention can determine which of the number of virtual machines have been active recently by checking its own respective host file system usage map 521. The host file system usage map 521 will identify which virtual file system has been active (e.g., which blocks of the physical volume have been updated). A replication manager 530 can access the host file system usage map 521 of the host machine and discover those active blocks out of a plurality of blocks of the host file system. The replication manager 530 can also access the virtual file system usage maps 511 and/or 512 of the virtual machines. The virtual file system usage maps 511 and 512 indicate the active blocks out of the total plurality of blocks of the virtual file systems. Using this information, a merged usage map 540 is generated by the replication manager. The merged usage map 540 identifies active blocks of the host file system (e.g., on the physical volume) that are associated with the virtual file systems.

In one embodiment, the virtual machine needs to be mounted by the host machine in order for replication manager to access the virtual file system usage map. In such an embodiment, the virtual machine and the virtual file system 511 need to be mounted by the hypervisor and the host file system 520 in order to allow the replication manager 530 to access the usage map 511 of the virtual file system 501.

Alternatively, in one embodiment, the virtual machine does not need to be mounted by the host machine to access the host file system. In such an embodiment, the replication manager 530 can more directly access the usage map 511 of the virtual file system 501 (e.g., via an API call, etc.).

Figure 6:
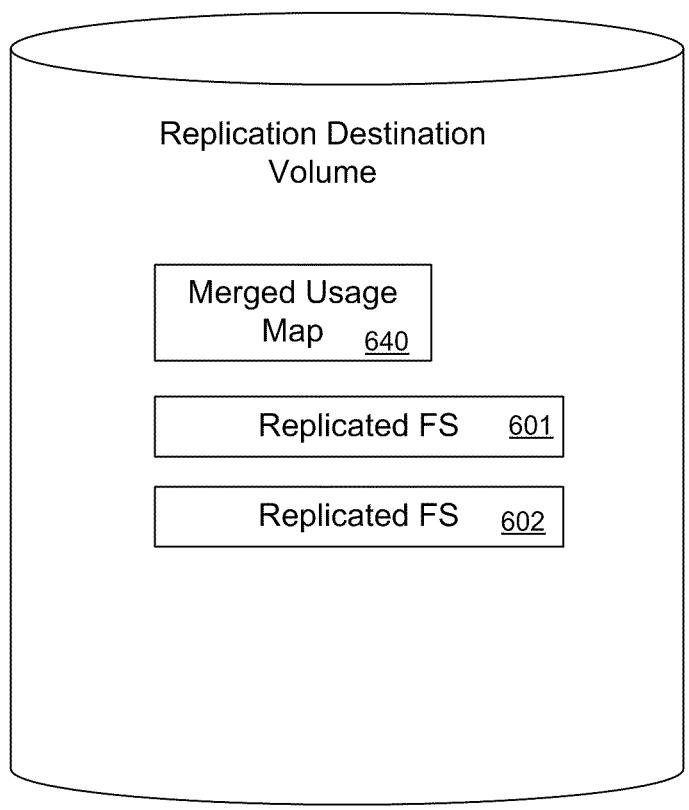
FIG. 6 shows a diagram of a replication destination volume as instantiated on a physical device in accordance with one embodiment of the present invention.

FIG. 6 shows a diagram of a replication destination volume as instantiated on a physical device in accordance with one embodiment of the present invention. As described above, the replication destination volume can be implemented as, for example, one or more LUNs on server 140A or 140B, or one of storage devices 160A(1)-(N), 160B(1)-(N), 180(1)-(N) or storage array 190. Once the merged usage map 540 is generated, those active blocks of the host file system (e.g., on the physical volume) that are associated with the virtual file systems are transferred to the replication destination and are used to create the replicated file systems 601 and 602. The replicated file systems 601 and 602 are mirrors of the virtual file system 501 and 502. As described above, the I/O traffic during the replication process is minimized since only the used space is transferred to create the replicated file systems 601 and 602.

In one embodiment, the merged usage map 640 can also be replicated at the replication destination volume. The merged usage map 640 is a copy of the merged usage map 540.

Figure 7:
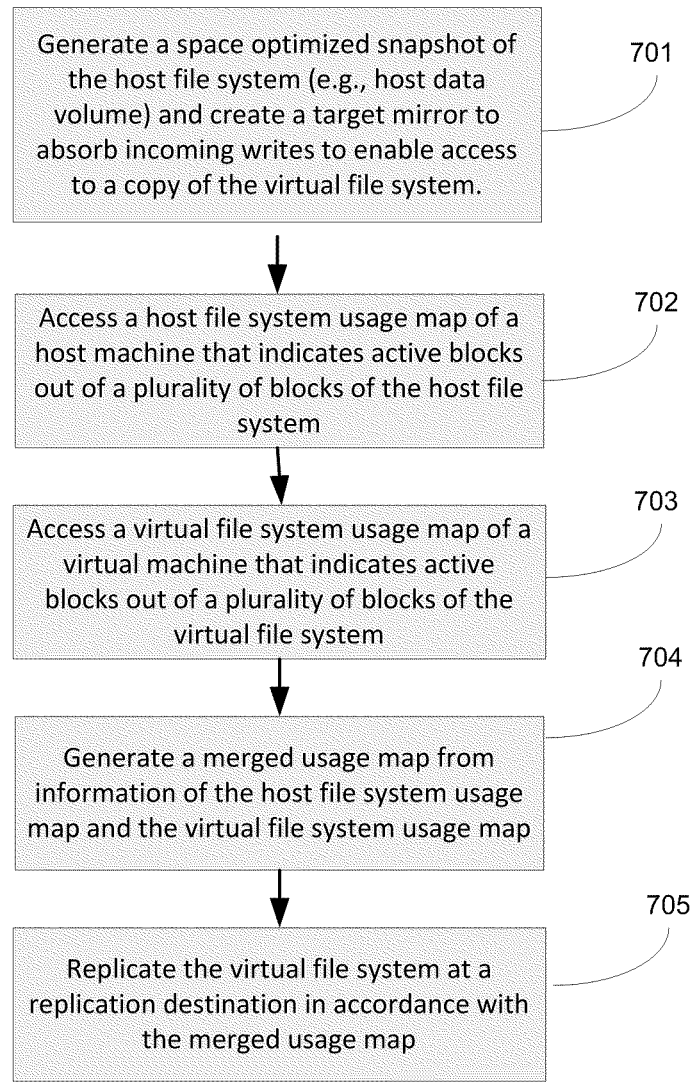
FIG. 7 shows a flowchart of the steps of a replication process in accordance with one embodiment of the present invention.

FIG. 7 shows a flowchart of the steps of a replication process 700 in accordance with one embodiment of the present invention. As depicted in FIG. 7, process 700 shows exemplary operating steps involved in implementing replication for a virtual file system of a virtual machine. In one embodiment, the replication process is performed on a data volume that includes multiple virtual file systems, where all the virtual file systems on the volume are replicated. As described above, embodiments of the present invention are directed towards replicating a data volume optimally. The volume may have a host file system and/or one or more virtual file systems belonging to one or more virtual machines.

Process 700 begins in step 701, where the replication manager causes the generation of a space optimized snapshot of the host file system (e.g., host data volume). As described above, the virtual file system is in active use by its respective applications. Taking a snapshot enables access to a copy of the virtual file system without disturbing the online status of the target virtual file system. In this step we first create the target mirror data volume so that any new writes that occur while the replication process is analyzing the space optimized read-only copies will be properly accounted for.

It should be noted that the space optimized snapshot uses a comparatively small amount of storage space to accommodate copy on write to account for new writes in the host file system. It should also be noted that the copy is used to access the one or more virtual file systems without interfering with the one or more virtual machines which are online and using the original virtual file systems. Furthermore, the target mirror is created at this point so that it can already start receiving new data being written to the host/virtual files systems while the replication process is using the snapshot copies of virtual file systems.

In step 702, the replication manager accesses a host file system usage map of a host machine that indicates active blocks out of a plurality of blocks of the host file system. In one embodiment, to maintain the accessibility of the virtual file system on the primary volume, a point-in-time "snapshot" volume is created and the replication is performed using the snapshot volume.

In step 703, the replication manager uses the space optimized snapshot to access a virtual file system usage map of a virtual machine that indicates active blocks out of a plurality of blocks of the virtual file system. As described above, access to the virtual file system usage map can be implemented either by mounting the virtual disk files on the snapshot through a separate virtual machine or by using off-line tools or APIs which understand the virtual file format (e.g., VHD/VMDK etc formats, or the like).

In step 704, the replication manager generates a merged usage map from information of the host file system usage map and the virtual file system usage map that identifies active blocks of the host file system associated with the virtual file system. In a case where there are multiple virtual file systems on the volume, all of the usage maps from the virtual file systems are used to create the merged usage map.

Subsequently, in step 705, the replication manager replicates the virtual file system at a replication destination in accordance with the merged usage map. For example, in one implementation, the replication manager uses the merged usage map from step 704 to copy in-use blocks from the host file system (e.g., the source volume) onto the target mirror created in step 701 to complete the replication (e.g., the mirror/clone creation).

Figure 8:
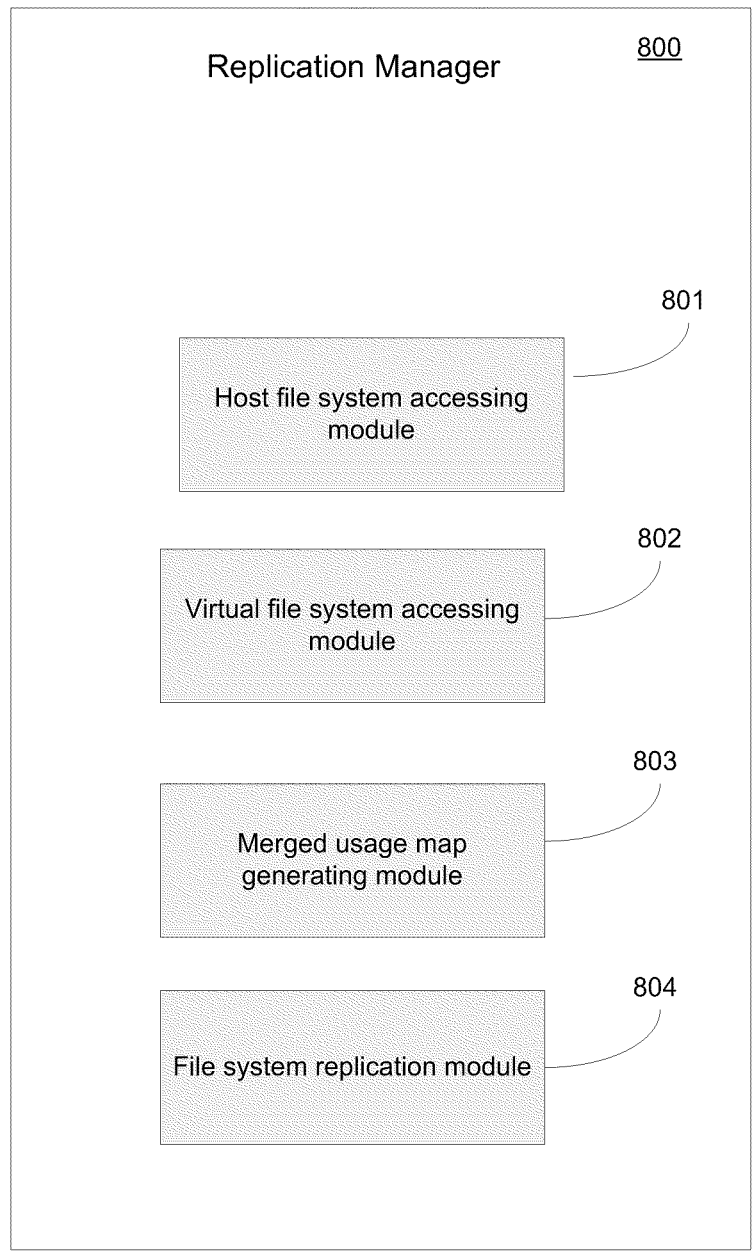
FIG. 8 shows a diagram of a replication manager that implements certain aspects of the replication functionality in accordance with one embodiment of the present invention.

FIG. 8 shows a diagram of a replication manager 800 that implements certain aspects of the replication functionality in accordance with one embodiment of the present invention. The replication manager 800 is a software component or module that when instantiated, implements the functionality of the replication processes of embodiments of the present invention. The replication manager 800 includes a host file system accessing module 801 that functions by accessing the host file system to read the usage maps the host file system. A virtual file system accessing module 802 is included and functions by accessing the virtual file system of a virtual machine and reading the usage map of the virtual file system. A merged usage map generating module is included and is used for merging the information from the host file system usage map with the information from the virtual file system usage map. A file system replication module is included for replicating data blocks comprising the virtual file system in accordance with the merged usage map.

Figure 9:
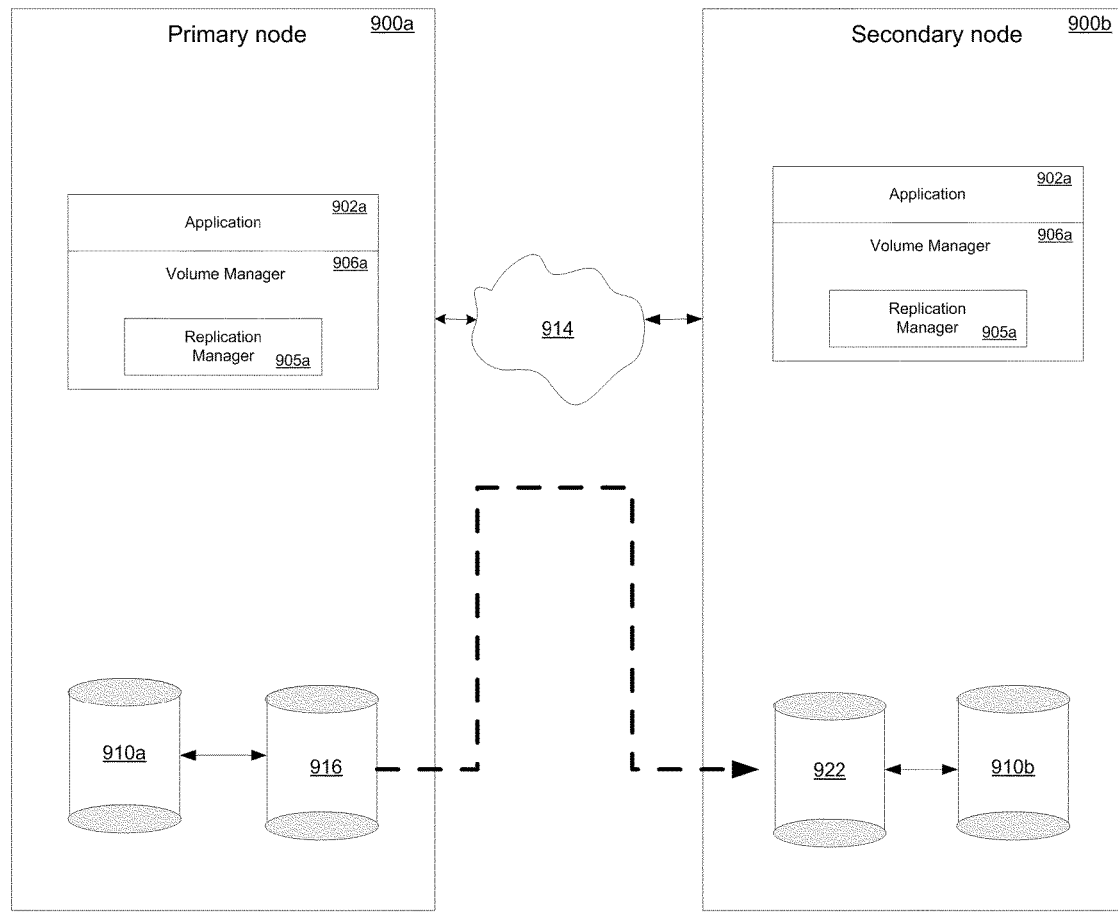
FIG. 9 illustrates a snapshot replication operation within an exemplary replication system environment according to one embodiment of the present invention.

FIG. 9 illustrates a snap shot replication operation within an exemplary replication system environment according to one embodiment of the present invention. To maintain the accessibility of the virtual file system on the primary volume, a point-in-time "snapshot" volume (sv) is created and the replication is performed using the snapshot volume. In the illustrated embodiment, copies of incrementally modified or changed data (e.g., of the virtual file system 301 of FIG. 3) of a primary volume (v) on which a primary file system is mounted within primary node 900*a* are transferred to a replicated secondary volume (vr) on which a secondary file system is mounted within a secondary node 900*b* as needed by the replication process. A point-in-time "snapshot" volume (sv) is created and the replication is performed using the snapshot volume in order to maintain the accessibility of the primary volume. Similarly, to maintain the accessibility of the secondary volume, a point-in-time "snapshot" volume (rsv) is created and used at the secondary node 900*b* to receive incremental changes from the primary node 900*a* and to restore the replicated secondary volume. In this manner, embodiments of the present invention keep the virtual machine and virtual file system online and accessible and fully functional throughout the replication process.

In the replication system of the illustrated embodiment, a primary node 900*a* is coupled to a secondary node 900*b* via a network 914 (e.g., an IP network, LAN, WAN, or other communication link). Primary node 900*a* and secondary node 900*b* of the illustrated embodiment each respectively includes an application 902, a volume manager 906 and a periodic replication manager 905 as shown.

It should be noted that although the volumes 910*a*, 910*b*, 916 and 922 are illustrated as residing within the enclosures of the primary node 900*a* and the secondary node 900*b* (e.g., disk drives, solid-state disks, or the like), the volumes can reside outside the enclosures and can be accessed via network and/or bus connections (e.g., ethernet, fiber channel, etc.).

Figure 10:
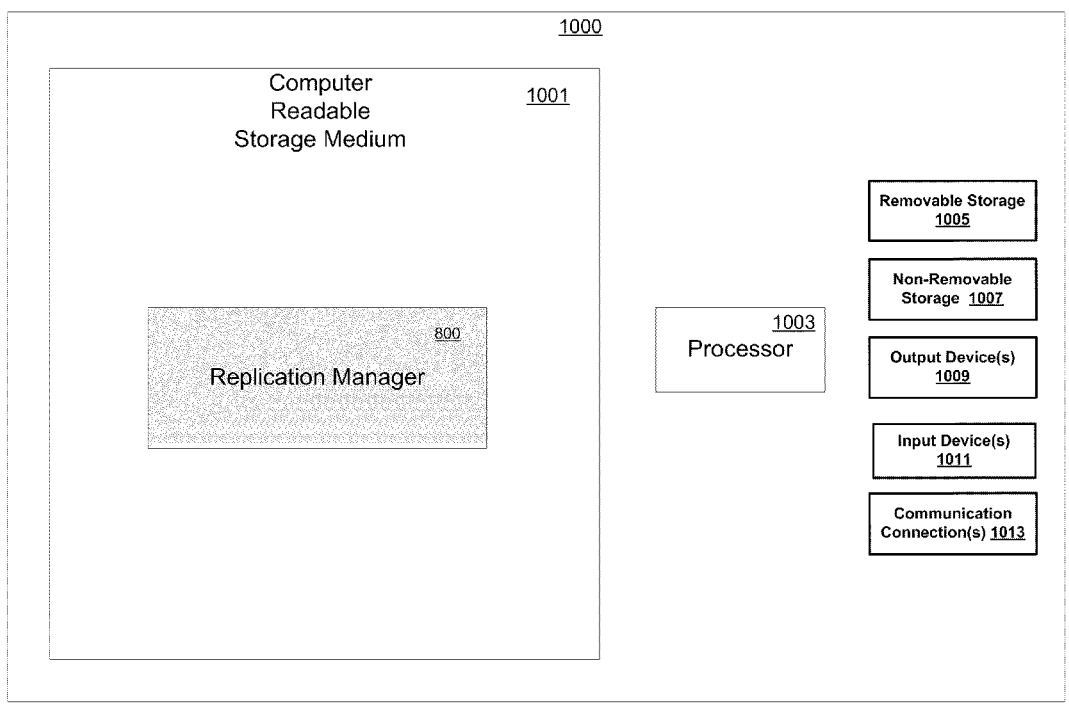
FIG. 10 depicts a block diagram of a computer system suitable for implementing certain functionality in accordance with one embodiment of the present invention.

FIG. 10 shows an exemplary computer system 1000 according to one embodiment. Computer system 1000 depicts the components of a basic computer system providing the execution environment for certain hardware-based and software-based functionality for the above described embodiments. For example, computer system 1000 can be a system upon which the replication manager 905*a* and one or more software stacks from FIG. 9 are instantiated. Computer system 1000 can be implemented as, for example, a server computer system, workstation computer system, desktop computer system, or laptop computer system. Similarly, computer system 1000 can be implemented as a handheld device. Computer system 1000 typically includes at least some form of computer readable media (e.g., computer readable storage medium 1001). Computer readable media can be a number of different types of available media that can be accessed by computer system 1000 and can include, but is not limited to, computer storage media.

In its most basic configuration, computer system 1000 typically includes processing unit 1003 and a computer readable storage medium 1001. Depending on the exact configuration and type of computer system 1000 that is used, memory 1001 can be volatile (e.g., such as DRAM, etc.), non-volatile (e.g., such as ROM, flash memory, etc.) or some combination of the two. Similarly, the memory 1001 can comprise other devices besides solid-state devices, such as, for example, magnetic disk-based media, optical media, or the like.

Additionally, computer system 1000 can include other mass storage systems (e.g., removable 1005 and/or non-removable 1007) such as magnetic or optical disks or tape. Similarly, computer system 1000 can include input devices 1011 and/or output devices 1009 (e.g., such as a display).

Computer system 1000 can further include communication connections 1013 to other devices, computers, networks, servers, etc. using either wired or wireless media. As all of these devices are well known in the art, they need not be discussed in detail.

It should further be noted, that the computer system 1000 can have some, most, or all of its functionality supplanted by a distributed computer system having a large number of dispersed computing nodes, such as would be the case where the functionality of the computer system 1000 is partly or wholly executed using a cloud computing environment.

Figure 11:
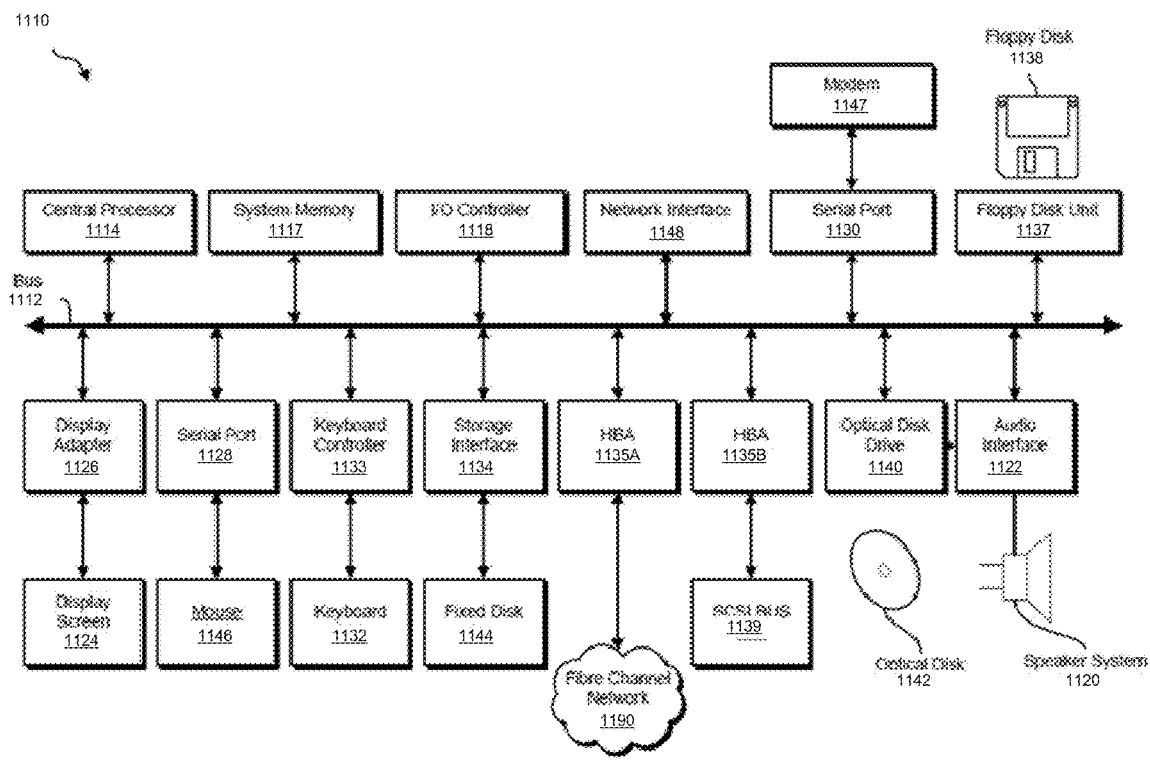
FIG. 11 depicts a block diagram of a second computer system suitable for implementing certain functionality in accordance with one embodiment of the present invention.

FIG. 11 depicts a block diagram of a second computer system 1110 suitable for implementing certain functionality in accordance with one embodiment of the present invention. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. In the FIG. 11 embodiment, the system memory 1117 instantiates a replication manager module 1150 which implements the continuous replication functionality described above. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. The operation of a computer system such as that shown in FIG. 11 is readily known in the art and is not discussed in detail in this application. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for replicating a virtual file system of a virtual machine, comprising:
 generating a snapshot of a host file system, wherein generating the snapshot comprises receiving and accounting for new writes to the host file system;
 accessing a host file system usage map of a host machine that indicates active blocks out of a plurality of blocks of the host file system, wherein the active blocks of the host file system consist only of blocks that have been modified after generating the snapshot;
 accessing a virtual file system usage map of a virtual machine that indicates active blocks of the virtual file system out of a plurality of blocks of the virtual file system;
 generating a merged usage map from information of the host file system usage map and the virtual file system usage map that identifies the active blocks of the host file system associated with the virtual file system;

replicating the virtual file system at a replication destination in accordance with the merged usage map by copying only the active blocks of the host file system associated with the virtual file system such that a used space associated with the active blocks in use at the host file system and inside the virtual file system is transferred to create the replicated virtual file system but a white space is skipped, wherein the replication of the virtual file system is performed using the snapshot, and wherein the virtual file system is configured to remain online during the replication of the virtual file system; and replicating the merged usage map at the replication destination; and wherein the virtual file system is instantiated as a fixed virtual storage device that allocates all blocks in advance.

2. The method of claim 1, wherein the virtual machine is mounted by the host machine to access the host file system.

3. The method of claim 1, wherein the snapshot of the virtual file system receives incremental changes from the host file system and the replication of the virtual file system is performed using the snapshot volume.

4. The method of claim 3, wherein the snapshot enables access to a copy of the virtual system to permit the virtual file system to remain online during the replication of the virtual file system.

5. The method of claim 1, wherein the replication destination is a physical storage device that implements RAID functionality.

6. The method of claim 1, wherein the host file system usage map comprises a file system usage bitmap.

7. A non-transitory computer readable storage medium having stored thereon, computer executable instructions that, if executed by a computer system cause the computer system to perform a method comprising:

generating a snapshot of a host file system, wherein generating the snapshot comprises receiving and accounting for new writes to the host file system;

accessing a host file system usage map of a host machine that indicates active blocks out of a plurality of blocks of the host file system, wherein the active blocks of the host file system consist only of blocks that have been modified after generating the snapshot;

accessing a virtual file system usage map of a virtual machine that indicates active blocks of the virtual file system out of a plurality of blocks of the virtual file system;

generating a merged usage map from information of the host file system usage map and the virtual file system usage map that identifies the active blocks of the host file system associated with the virtual file system;

replicating the virtual file system at a replication destination in accordance with the merged usage map by copying only the active blocks of the host file system associated with the virtual file system such that a used space associated with the active blocks in use at the host file system and inside the virtual file system is transferred to create the replicated virtual file system but a white space is skipped, wherein the replication of the virtual file system is performed using the snapshot, and wherein the virtual file system is configured to remain online during the replication of the virtual file system; and replicating the merged usage map at the replication destination; and wherein the virtual file system is instantiated as a fixed virtual storage device that allocates all blocks in advance.

8. The non-transitory computer readable storage medium of claim 7, wherein the virtual machine is mounted by the host machine to access the host file system.

9. The non-transitory computer readable storage medium of claim 7, wherein the snapshot of the virtual file system receives incremental changes from the host file system and the replication of the virtual file system is performed using the snapshot volume.

10. The non-transitory computer readable storage medium of claim 9, wherein the snapshot enables access to a copy of the virtual system to permit the virtual file system to remain online during the replication of the virtual file system.

11. The non-transitory computer readable storage medium of claim 7, wherein the replication destination is a physical storage device that implements RAID functionality.

12. The non-transitory computer readable storage medium of claim 7, wherein the host file system usage map comprises a file system usage bitmap.

13. A volume replication system, comprising:

a computer system having a processor coupled to a computer readable storage media and executing computer readable code which causes the computer system to implement a replication manager module, wherein the replication manager module:

generate a snapshot of a host file system, wherein generating the snapshot comprises receiving and accounting for new writes to the host file system;

accesses a host file system usage map of a host machine that indicates active blocks out of a plurality of blocks of the host file system, wherein the active blocks of the host file system consist only of blocks that have been modified after generating the snapshot;

accesses a virtual file system usage map of a virtual machine that indicates active blocks of the virtual file system out of a plurality of blocks of the virtual file system;

generates a merged usage map from information of the host file system usage map and the virtual file system usage map that identifies the active blocks of the host file system associated with the virtual file system;

replicates the virtual file system at a replication destination in accordance with the merged usage map by copying only the active blocks of the host file system associated with the virtual file system such that a used space associated with the active blocks in use at the host file system and inside the virtual file system is transferred to create the replicated virtual file system but a white space is skipped, wherein the replication of the virtual file system is performed using the snapshot, and wherein the virtual file system is configured to remain online during the replication of the virtual file system; and replicating the merged usage map at the replication destination; and wherein the virtual file system is instantiated as a fixed virtual storage device that allocates all blocks in advance.

14. The system of claim 13, wherein the virtual machine is mounted by the host machine to access the host file system.

15. The system of claim 13, wherein the snapshot of the virtual file system receives incremental changes from the host file system and the replication of the virtual file system is performed using the snapshot volume.

16. The system of claim 15, wherein the snapshot enables access to a copy of the virtual system to permit the virtual file system to remain online during the replication of the virtual file system.

* * * * *